United States Patent [19]

Strait et al.

[11] Patent Number: 6,038,315
[45] Date of Patent: Mar. 14, 2000

[54] METHOD AND SYSTEM FOR NORMALIZING BIOMETRIC VARIATIONS TO AUTHENTICATE USERS FROM A PUBLIC DATABASE AND THAT ENSURES INDIVIDUAL BIOMETRIC DATA PRIVACY

[75] Inventors: Robert S. Strait, Oakland; Peter K. Pearson; Sailes K. Sengupta, both of Livermore, all of Calif.

[73] Assignee: The Regents of the University of California, Oakland, Calif.

[21] Appl. No.: 08/819,158

[22] Filed: Mar. 17, 1997

[51] Int. Cl.[7] .................................................. H04L 9/00
[52] U.S. Cl. ................................. 380/23; 382/115
[58] Field of Search .......................... 382/115, 116, 382/117, 118; 380/23, 25, 4; 713/202

[56] References Cited

U.S. PATENT DOCUMENTS 5,228,094   7/1993   Villa ............................................. 382/4

*Primary Examiner*—Gail O. Hayes
*Assistant Examiner*—Ho S. Song
*Attorney, Agent, or Firm*—Henry P. Sartorio; Lloyd E. Dakin, Jr.

[57] ABSTRACT

A password system comprises a set of codewords spaced apart from one another by a Hamming distance (HD) that exceeds twice the variability that can be projected for a series of biometric measurements for a particular individual and that is less than the HD that can be encountered between two individuals. To enroll an individual, a biometric measurement is taken and exclusive-ORed with a random codeword to produce a "reference value." To verify the individual later, a biometric measurement is taken and exclusive-ORed with the reference value to reproduce the original random codeword or its approximation. If the reproduced value is not a codeword, the nearest codeword to it is found, and the bits that were corrected to produce the codeword to it is found, and the bits that were corrected to produce the codeword are also toggled in the biometric measurement taken and the codeword generated during enrollment. The correction scheme can be implemented by any conventional error correction code such as Reed-Muller code R(m,n). In the implementation using a hand geometry device an R(2,5) code has been used in this invention. Such codeword and biometric measurement can then be used to see if the individual is an authorized user. Conventional Diffie-Hellman public key encryption schemes and hashing procedures can then be used to secure the communications lines carrying the biometric information and to secure the database of authorized users.

20 Claims, 2 Drawing Sheets

Microfiche Appendix Included
(1 Microfiche, 25 Pages)

METHOD AND SYSTEM FOR NORMALIZING BIOMETRIC VARIATIONS TO AUTHENTICATE USERS FROM A PUBLIC DATABASE AND THAT ENSURES INDIVIDUAL BIOMETRIC DATA PRIVACY

The United States Government has rights in this invention pursuant to Contract No. W-7405-ENG-48 between the United States Department of Energy and the University of California for the operation of Lawrence Livermore National Laboratory. Appendix A, which is part of the present disclosure, is a microfiche appendix consisting of one sheet and total of 25 frames.

A portion of the disclosure of this patent document contains material which is subject to copyright protection. The copyright owner has no objection to the facsimile reproduction by anyone of the patent document or the patent disclosure, as it appears in the Patent and Trademark Office patent file or records, but otherwise reserves all copyright rights whatsoever.

BACKGROUND OF THE INVENTION

1. Field of the Invention

The present invention relates to authorization systems and more particularly to identity and verification systems and methods at least partially dependent on biometrics.

2. Description of Related Art

Fingerprints, voiceprints, hand geometries, retinal vessel patterns and iris texture characteristics have all been used in biometric measurements to identify individuals to security systems. Such measurements are usually coded into a statistically unique bit pattern for each individual and stored in a database that represents the list of individuals with a particular kind of access authority. A new level of complexity in authorizing an access is encountered when the requisite statistical tests in a verification task cannot be made on the spot because the authorized access list database is at some other remote location. Often the data recorded that describes an individual is stored at a remote location and so verification requires the transmission of private data over an insecure channel. For remote secure proof of identity, the prior art typically uses cryptographic methods for such verification.

Many private and public sector information applications depend on public key cryptography and secure proof of a user's identity. Biometric measurement data, albeit subject to statistical variations, is nevertheless conventionally used to verify the identity of individuals. Prior art methods used are based on a kind of statistical hypothesis testing where each person's biometric measurements are stored at the time of "enrollment" at some central facility. Then during "verification," biometric measurements are taken again and compared to the stored measurements. Since the privacy of the individual data is compromised, it is important to store such private biometric data at a secure place within an authentication system. It is also equally important to avoid transmitting such data over insecure communication channels.

Data privacy can be addressed by using standard cryptographic methods, but many cryptographic applications require exact and unique bit patterns for the encryption and decryption functions. A type of error correction procedure is needed to repeatedly reproduce the right bit pattern because sequential biometric measurements will have a range for any one individual, especially when taken at different times and places using even slightly different equipment.

An error correction mechanism must therefore be incorporated in some part of a system for biometric data to be used for remote secure proof of identity. However, the number of bits that can be corrected by practical error detecting and correcting codes is inherently limited. And getting reproducible bits from individual biometric measurements is a fundamental problem.

SUMMARY OF THE INVENTION

An object of the present invention is to provide a method and system for secure remote verification of individuals.

Another object of the present invention is to provide a method and system for biometric measurement data variability detection and correction.

A further object of the present invention is to provide a method and system for obtaining a precise and repeatable data quantity from a variable quantity distributed around a fixed nominal value.

A still further object of the present invention is to provide a method and system for deriving a precise and repeatable password from a biometric measurement that can vary within defined bounds from measurement to measurement.

Briefly, a method embodiment of the present invention comprises establishing a set of codewords spaced apart from one another by a Hamming distance (HD) that exceeds the variability that can be projected for a series of biometric measurements for a particular individual and that is less than the HD that can be encountered between two individuals. To enroll an individual, a biometric measurement is taken and exclusive-ORed with a random codeword to produce a "reference value." To verify the individual later, a biometric measurement is taken and exclusive-ORed with the reference value to reproduce the original random codeword or its approximation. If the reproduced value is not a codeword, the nearest codeword to it is found, and the bits that were corrected to produce the codeword are also toggled in the biometric measurement, thereby recovering both the original biometric measurement taken and the random codeword generated during enrollment. This recovery is implemented by a conventional error correction code like the Reed-Muller code R(m,n) with suitable values for m and n. Such biometric measurement and/or the corrected codeword can then be used to verify if the individual is an authorized user.

Conventional Diffie-Hellman public key encryption schemes and hashing procedures can then be used to secure the communications lines carrying the biometric information and to secure the database of authorized users.

An advantage of the present invention is that a method and system are provided for using data derived from biometric measurements as cryptographic keys.

A further advantage of the present invention is that a method and system are provided for securing a cryptographic system based on biometric measurements.

DETAILED DESCRIPTION OF THE INVENTION

Figure 1:
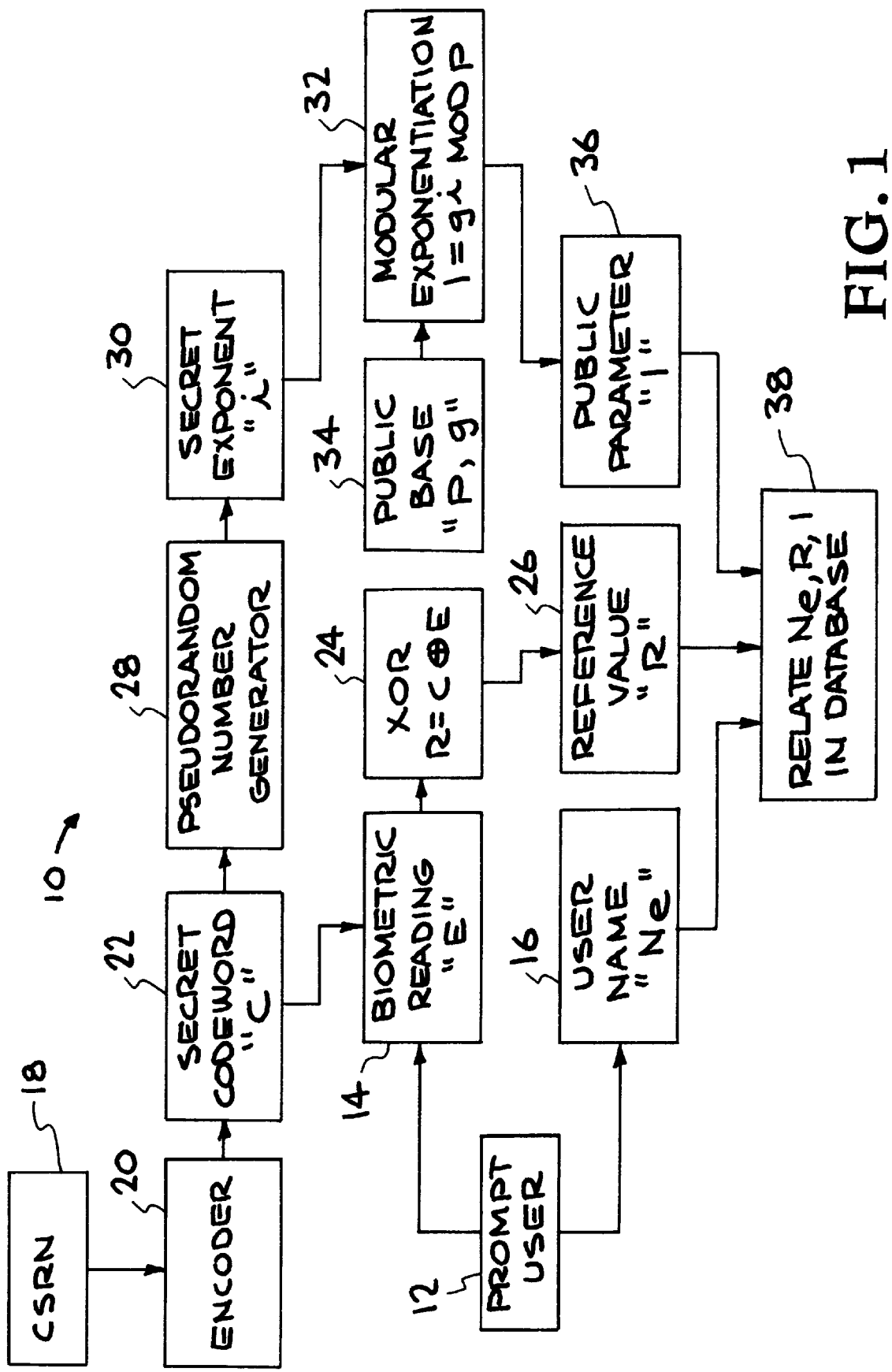
FIG. 1 is a dataflow diagram of an enrollment method embodiment of the present invention.

FIG. 1 illustrates an enrollment method embodiment of the present invention, referred to herein by the general reference numeral 10. A step 12 prompts a user to-be-enrolled to provide a biometric reading "E" 14 and a name "$N_e$," 16. The biometric reading "E" may be the digital representation of a hand geometry, a fingerprint, a body weight, an iris, etc. The name "$N_e$" 16 may be the user's proper name or a login. A cryptographically secure random number "CSRN" 18 is processed by an encoder 20 to produce a secret codeword "C" 22. The encoder encodes the "CSRN" to produce a codeword of some error-correcting code. Any generic error correcting code that can correct the required number of bits generated from a biometric measurement can be used successfully. The effect of the random number generator and the encoder is to select one of the codewords of the error-correcting code at random. All possible codewords belong to a set in which adjacent codewords have an inter-codeword Hamming distance that is greater than twice the largest Hamming distance probable between two measurements from any one individual. The codeword "C" 24 is exclusive-OR'ed (XOR) with the biometric reading "E" 14 to produce a reference value "R" 26. A pseudorandom number generator 28 is used to spawn a secret exponent "i" 30 from the secret codeword "C" 22. The pseudorandom number generator 28 is such that the same "C" will produce the same "i", but the transfer function "f", e.g., as in i=f (C), is a cryptographically secure pseudo-random value. A modular expotentiation step 32 is used to compute, from a public base "p, g" 34, a public parameter "I" by I=$g^i$ mod p. The values "$N_e$" 16, "R" 26, and "I" 36 are related as a set in a database in a step 38. The database is such that the name "$N_e$" 16 can be used to fetch back the associated public values "R" 26 and "I" 36, e.g., during a user verification procedure.

Figure 2:
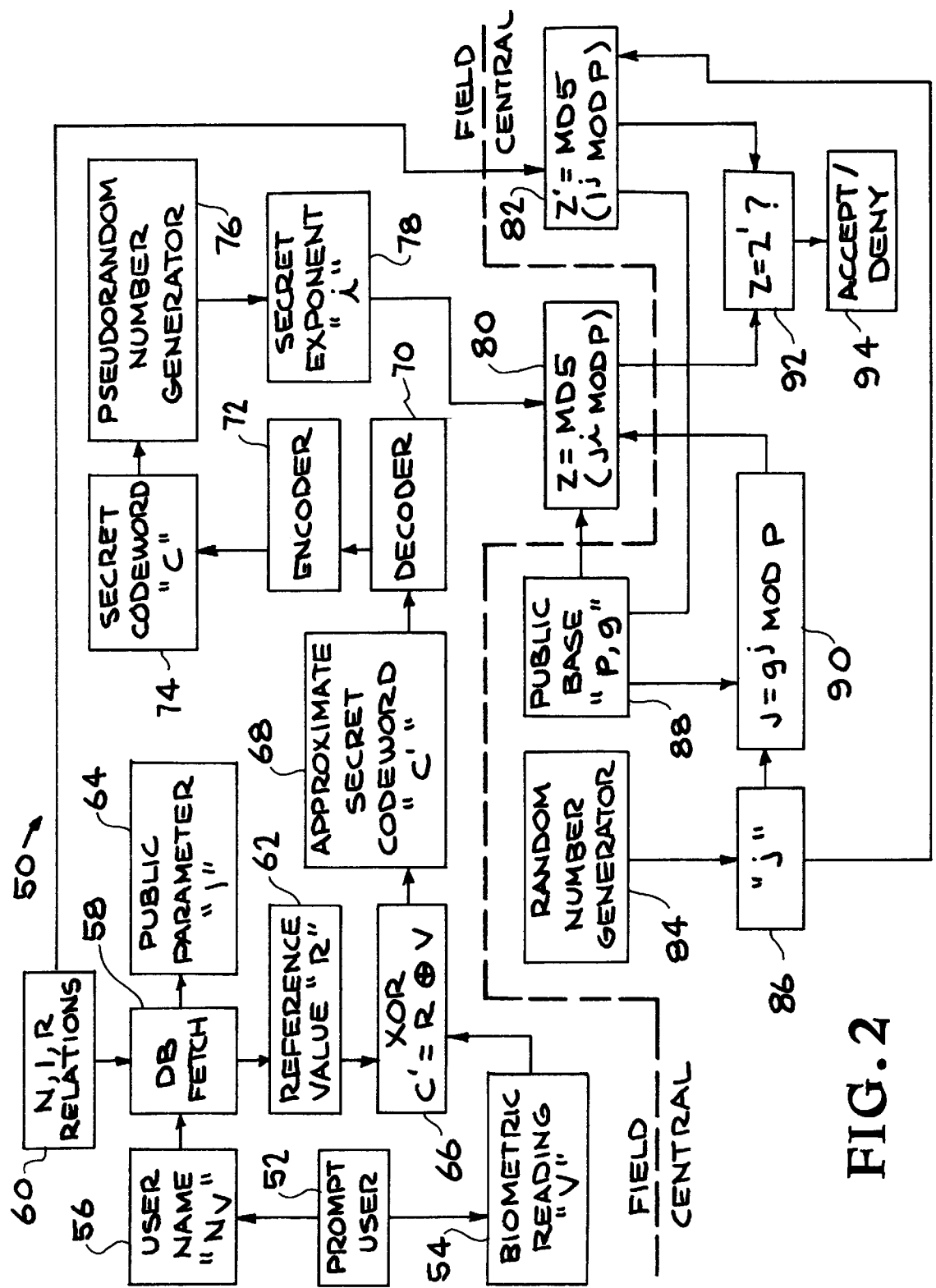
FIG. 2 is a dataflow diagram of a verification method embodiment of the present invention.

FIG. 2 illustrates a verification method embodiment of the present invention, referred to herein by the general reference numeral 50. A step 52 prompts a user to-be-verified to provide a biometric reading "V" 54 and a name "$N_v$" 56. A database fetch step 58 uses the user to-be-verified name "$N_v$" 56 to index a set of N-I-R relations 60. Such sets of relations pair the users to-be-verified in a database with the public values "I" and "R". If the user to-be-verified name "$N_v$" 56 matches an enrolled user name "$N_e$" 16, the original values R and I, e.g., stored in step 38 (FIG. 1), are returned as a reference value "R" 62 and a public parameter "I" 64. If the user to-be-verified name "$N_v$" 56 does not match an enrolled user name "$N_e$" 16, verification fails early and any requested access to a secure asset is denied. A step 66 does an exclusive-OR to produce an approximate codeword "C'" whose Hamming distance from the secret codeword of the enrollment is the same as the Hamming distance between the present biometric measurement and the enrollment biometric measurement.

The approximate secret codeword "C'" will be outside the Hamming distance spacing between adjacent codewords if the user to-be-verified is not the same as the user that was enrolled. If the approximate codeword differs from the enrollment codeword in HD by more than the natural variability allowed for in the ECC used, then the user to be verified is presumed not to be the one enrolled. A decoder 70 and an encoder 72 convert the approximate secret codeword "C'" 68 to a secret codeword "C" 74 that has a channelized value, e.g., as integers do in the continuum of real numbers. 70 and 72 remove the effects of biometric variations that occur for an enrolled individual but still allow discrimination between enrolled and non-enrolled individuals. A pseudorandom number generator 76 is seeded with the secret codeword "C" 74 and produces a secret exponent "i" 78, e.g., really "$i_v$". Such secret exponent "i" 78 is provided to a step 80 that computes z=MD5 ($J^i$ mod p) where MD5 represents a one-way hash function. A pseudorandom number generator 84 produces a value "j" 86 that is used in step 82 to compute "z'". The public base "p, g" and "j" are used in a step 90 to compute, J=$g^j$ mod p. Such solution "J" is used in step 80. Both "z" and "z'" from steps 80 and 82 are used in a comparison 92 that has an outcome that controls an accept/deny decision 94. Whether to allow a transaction or to pass the individual to-be-verified depends on decision 94.

Given two bit-strings of the same length n, S=($s_1$, $s_2$, ..., $s_n$) and T=($t_1$, $t_2$, ..., $t_n$) their Hamming distance is H (S, T), and is the number of positions where the bits differ from one another in the two strings. It can also be defined as the number of ones in the string obtained from the exclusive-OR of the S and T strings, represented by S⊕T. Statistical distributions of Hamming distances between two bit strings of equal size derived from biometric readings of the same and different individuals are important in the verification of an individual's identity.

Biometric features represented as "carefully tailored" bit strings from distinct individuals tend to generate statistically distinct Hamming distance clusters that are well separated from each other. Smaller cluster diameters have better separation. As a consequence, the Hamming distance distribution between any two bit strings derived from sequential biometric measurements of the same individual can almost always be differentiated from the distribution of Hamming distances that results from any two biometric measurements taken from two different individuals. The distribution of the normalized Hamming distance will increase in sharpness when more individual information content is included in each reading, such as from iris readings. For example, the distribution of the normalized Hamming distance, e.g., the Hamming distance divided by the string length, between unrelated iris codes has an approximate normal distribution with a mean equal to 0.497 and standard deviation equal to 0.038. See, Daugman, J. G., "High Confidence Visual Recognition of Persons by a Test of Statistical Independence", *IEEE Trans. PAMI*, vol. 15, no. 11, 1993. In contrast, the same measurement for two different observations of the same eye has a mean of 0.084 and standard deviation of 0.0435. The two distributions are well separated for all practical purposes, and statistical hypothesis testing can be used to form a basis for distinguishing between a set of specific biometric measurements from an "authentic" individual and those of an "impostor".

Suitable bit string representations should retain as much individual information as possible but use as few bits as possible. In some embodiments of the present invention, the Hamming distance between the strings derived from any two readings of the same individual is preferably relatively small. Other similarity measures can also be used. Keeping as much individual information as possible clearly helps establish the uniqueness of the individual. Other constraints help ensure that only a minimal number of biometric bits will vary and thus need to be corrected. The number of bits that can be obtained is device-specific and depends on the kind of biometric reading involved.

The large spreads observed in practically all biometric measurements cuts against creating a bit string that is invariant for an individual. This can be overcome by using a binary "block" error-correcting code, where all codewords have the same length. Such codewords are preferably separated by some minimum from each other in the space of all possible words of a given length. The minimum Hamming distance between any two codewords therefore must be sufficiently large. The word received is corrected to the nearest codeword in the space of all words, e.g., the code word with the smallest Hamming distance from the received word.

Although Reed-Muller code R(2,5) has been successfully used for the error correction in the encrypted biometric data, other codes can also be used. The R(2,5) code has a length of thirty-two bits, sixteen information bits, a minimum Hamming distance of eight, and corrects three errors based on relatively easy to implement majority logic. When using a set of $2^{16}$ codewords each thirty-two bits long, and each differing from all the others by at least 8 bits, the associated R(2, 5) algorithm maps onto each codeword all bit patterns that differ from it by no more than three bits.

The Diffie-Hellman protocol (DH) is a cryptographic protocol that can be used with the present invention. It depends on the difficulty in calculating discrete logarithms in a finite field and is typically used for key negotiations between two individuals, e.g., A and B. For example, A and B can agree on two large integers "g" and "p" which do not need to be kept private. The limitations are that "p" must be a prime, (p–1)/2 is a prime, g is a primitive root mod "p", and "p" is at least 512 bits long.

Using the DH protocol, "A" chooses a cryptographically secure pseudo-random large integer i and computes $I=g^i$ mod p, "B" chooses a cryptographically secure pseudo-random large integer j and computes $J=g^j$ mod p, "A" sends I to "B" and "B" sends J to "A", where i and j are respectively secrets of "A" and "B". "A" then computes the shared, secret key $k=j^i$ mod p, and "B" computes the same key as $k'=I^j$ mod p. Importantly, $k=g^{ij}$ mod p=k', although the common value of k and k' has been computed independently by "A" and "B" without having to divulge i or j. In the usual analysis of this protocol, an adversary is presumed to know g, p, I, and J. From these numbers, no way is known to compute k faster than by computing the discrete logarithm of I, or J, base g in the field of integers modulo p. Such discrete logarithm computation is prohibitive due to its computational complexity. The fastest known algorithm for this problem is too slow to be practicable for p values larger than $2^{500}$. At present it is not known if the ability to compute the discrete logarithm of a number is a necessary ingredient in a successful attack against D-H key exchange.

The MD5 hashing algorithm produces a 128-bit hash and is described by Ron Rivest in "The MD5 Message Digest Algorithm", RFC 1321, April 1992. Although such has not been successfully attacked, a collision resistant compression function is nevertheless included. The objective in using a message digest function is to avoid revealing $k=J^i$ mod p by the field station. A "corrupt" central station does not have any advantage in reconstructing the discrete logarithm i, the secret of the user at the field station.

Other message digest functions with more cryptographically desirable attributes can be substituted for the MD5 function. The use of Diffie-Hellman coupled with a message digest function can be avoided altogether and still knowledge of a discrete logarithm can be proved. The field station could, for example, use the protocol described by Chaum, et al., in "Demonstrating Possession of a Discrete Logarithm Without Revealing It", Crypto '86 Proceedings, Springer Verlag, p200–212, 1987, and applied by Schneier, B., in "Applied Cryptography: Protocols, Algorithms, and Source Code in C", John Wiley and Sons, Inc., New York, 618 p., 1994.

The RMC and D-H key exchange have been combined to build a system that provides remote secure proof of identity using reproducible biometric data. The MD5 hashing has been used to add another level of protection in the system. In the final step of the verification, instead of the central station checking the equality of $J^i$ mod p and Ij mod p directly, it compares their MD5-hashed values z and z'. The purpose here is to avoid the possibility of a rogue central station being able to do any meaningful mathematical analysis on this value, and thus strengthens the security of the private data.

Appendix A contains the source code for a simple demonstration program that was written for a proof-of-principle and demonstration system.

Although particular embodiments of the present invention have been described and illustrated, such is not intended to limit the invention. Modifications and changes will no doubt become apparent to those skilled in the art, and it is intended that the invention only be limited by the scope of the appended claims.

-1-

The important program source files for the demonstration system
are provided here.  Each file is preceded by a file name surrounded by
hyphens. The low-level code has been omitted for such things as sending
and receiving characters over the serial port and placing text in boxes
on the screen, operations remote from the subject of our patent
application.  The code for requesting a reading from the hand geometry
reader is not included, as this code was based on that provided by the
manufacturer of the hand geometry reader.  The RSAREF code is also
omitted, which actually implements the Diffie-Hellman proof of knowledge
of a discrete logarithm. RSAREF is readily available on the Internet (by
anonymous login to site ftp.rsa.com), and is the property of RSA Data
Security Inc.  The process of obtaining it requires a promise not to
distribute it further.  The present invention is embodied in the
functions "enroll" and "makeResponse", both included in the first file,
"demo.c".  The "Enroll" takes the initial biometric reading, generates a
cryptographically secure pseudo-random codeword, and computes error-
correcting information that will translate the initial biometric reading
and any very similar reading into that codeword. "MakeResponse" contains
the instructions that combine an approximate biometric reading with
error-correcting information to reproduce reliably the original
codeword.

```
/* demo.c - Main
program for demonstration of biometric keys.
Version of 95.09.25.
*/ include <stdio.h>
include <ctype.h>
#include <string.h>
#include <conio.h>
#include <dos.h>      /* For gettime. */
#include "winplus.h"  /* For pauseMessage. */
#include "windows.h"  /* For text windows on screen. */
#include "userlist.h" /* Maintains list of users. */
#include "outputs.h"  /* For sequential output to various windows. */
#include "global.h"   /* For rsaref. */
#include "rsaref.h"   /* For Diffie-Hellman functions. */
#include "reading.h"  /* For getReading. */
#include "cryptographically secure pseudo-random.h"   /* For Rand32().
*/
include "reedmull.h"   /* For rmEncode and rmDecode. */ define EXTRA_TOLERANT 1
if EXTRA_TOLERANT > 0
#define REEDMULLER      1,5    /* Parameters specifying the code used. */
#else
#define REEDMULLER      2,5    /* Parameters specifying the code used. */
endif WindowType fieldWindow ;
```

© 1996 UC Regents      Appendix A      p. 1

-2-

```
WindowType centerWindow ;
WindowType messageWindow ;
WindowType commandWindow ;

#define kMaxCommandLength     80

/***********************************************************************
** Here we define the Diffie-Hellman parameters:
***********************************************************************/
#ifdef SHORT_PARAMETERS
#define kPrimeBits       100         /* Must match dhparams.exe. */
#define kSubprimeBits    40          /* Must match dhparams.exe. */
#else
#define kPrimeBits       600         /* Must match dhparams.exe. */
#define kSubprimeBits    200         /* Must match dhparams.exe. */
endif define kPrimeBytes      ((kPrimeBits+7)/8)
define kSubprimeBytes   ((kSubprimeBits+7)/8)
define kPrivateBytes    kSubprimeBytes static unsigned char prime[ kPrimeBytes ] =
    {
        /* Output from dhparams.exe: */
#ifdef SHORT_PARAMETERS
        0x09, 0xb1, 0xf2, 0x09, 0xba, 0x14, 0x9a,
        0x1e, 0x24, 0x0c, 0x17, 0x74, 0x49
#else
0xfc, 0x6e, 0xbc, 0xbe, 0xad, 0xc9, 0xc3, 0x6f, 0x98, 0x97,
0x78, 0x9f, 0x25, 0x93, 0xce, 0xaf, 0x70, 0xb9, 0xb1, 0x78,
0xbb, 0x08, 0x39, 0x5e, 0x8f, 0x86, 0xc6, 0x77, 0x67, 0x97,
0xc6, 0xa6, 0xed, 0x87, 0x7e, 0x51, 0x5f, 0xb2, 0x62, 0xee,
0x3a, 0x45, 0x39, 0x75, 0x90, 0x15, 0xcb, 0x3e, 0x20, 0x95,
0xf3, 0x5f, 0x8a, 0xb6, 0x11, 0x96, 0xf7, 0xde, 0xfb, 0x7f,
0xc2, 0x2d, 0xaa, 0x3b, 0x94, 0x7b, 0x67, 0x57, 0xe4, 0xee,
0xb1, 0xbb, 0xad, 0x00, 0x8d
#endif
    } ;

static unsigned char generator[ kPrimeBytes ] =
    {
#ifdef SHORT_PARAMETERS
        /* Output from dhparams.exe: */
        0x02, 0xf8, 0xb3, 0xe2, 0x81, 0xcb,
        0xbd, 0x0a, 0x6d, 0xf4, 0x6a, 0xa0, 0xc4
#else
0xf7, 0x52, 0x8b, 0xd1, 0xb2, 0x5b, 0x0c, 0xcd, 0x84, 0x15,
0xdb, 0x04, 0x08, 0x7d, 0x56, 0xe2, 0xb5, 0x2a, 0x8a, 0x44,
0xc7, 0x38, 0x3e, 0xdb, 0xf1, 0xef, 0xeb, 0xe0, 0x0a, 0x76,
0xb5, 0x5e, 0x9f, 0x3d, 0x46, 0x67, 0x31, 0x3c, 0x0c, 0x91,
0xa8, 0xff, 0x07, 0xd1, 0x3b, 0xd9, 0xac, 0x35, 0x55, 0x25,
0xa1, 0x82, 0x45, 0x92, 0xa2, 0xfa, 0xab, 0x50, 0x43, 0xdf,
0xa1, 0x09, 0x92, 0x4c, 0x76, 0x48, 0x7c, 0xd6, 0xbe, 0x70,
0x56, 0x81, 0x17, 0x4d, 0xfa
#endif
    } ;
```

© 1996 UC Regents          Appendix A          p. 2

-3-

```
static R_DH_PARAMS dhParams =
    {
        prime,
        kPrimeBytes,              /* Output from dhparams.exe. */
        generator,
        kPrimeBytes      /* Output from dhparams.exe. */
    } ;

/***************** End of Diffie-Hellman Parameter
definition.**************/ typedef struct
    {
        unsigned int length ;
        unsigned char bytes[ MAX_DIGEST_LEN ] ;
    } digestType ;

/*
** Here is the structure that holds the error-correction data that are
** used to recover exact numbers from the biometric reading:
*/ typedef struct
    {
        unsigned long refXorMask ;
    } errorCorrType ;

/*
** Here is the structure that holds the challenge that the host (Center)
** sends the Field when asking the Field to prove that it knows the
user's
** biometric reading:
*/
typedef struct
    {
        unsigned char challengePublic[ kPrimeBytes ] ;
    } challengeType ;

/*
** Here is the format of the Field's response to the Center's challenge:
*/
typedef struct
    {
        digestType digest ;
    } responseType ;

/*
** Here is the structure of the data saved at the Center for each user:
*/
typedef struct
    {
        errorCorrType errorCorr ;
        unsigned char publicValue[ kPrimeBytes ] ;
    } userRecordType ;

/**********************************************************************
* Here is information on the last challenge issued.
```

© 1996 UC Regents      Appendix A      p. 3

-4-

```
 * This information is off-limits to the code that runs in the "field".
 */ static unsigned char challengersPublic[ kPrimeBytes ] ;
static unsigned char challengersPrivate[ kPrimeBytes ] ;
static unsigned char proversPublic[ kPrimeBytes ] ;

/**********************************************************************/

/* The following macros cut down the clutter of many output lines.
** The first is useful for non-array objects, the second for arrays
** of fixed length.
*/ define OUTSSB_OBJ(x,y) outSameStepBytes(x,(unsigned char
*)&y,sizeof(y));
#define OUTSSB_PTR(x,y) outSameStepBytes(x,(unsigned char
*)y,sizeof(y));

/**********************************************************************/ static void clearWindows( void ) ;
static int compareDigests( digestType *a, digestType *b ) ;
static digestType *digestKey( unsigned char *key, int keyLength ) ;
static void help( void ) ;
static void enroll( char *name ) ;
static void evaluateResponse( responseType *response ) ;
static void generatePersonalParams( const readingType reading,
            unsigned char publicValue[ kPrimeBytes ],
            unsigned char privateValue[ kPrivateBytes ] ) ;
static char *getCommandLine( void ) ;
static void makeChallenge( userRecordType *userRecord,
              challengeType *challenge ) ;
static int makeResponse( errorCorrType *errorCorr,
              challengeType *challenge, responseType *response ) ;
static int popCount( unsigned long x ) ;
static char *trim( char *text ) ;
static void verify( char *name ) ;

int main( void )
{
    int keepOn ;
    char *commandLine ;

if ( openReader() != 0 )
    {
      fprintf( stderr,
          "Can't establish communications wtih the reader!\n" ) ;
      return 1 ;
    }
    clrscr() ;
    fieldWindow  = NewWindow( 1, 1, 38, 14,
      WIN_FRAME + WIN_TITLE, "Field Station" ) ;
    centerWindow = NewWindow( 40, 1, 80, 14,
```

© 1996 UC Regents      Appendix A      p. 4

```
      WIN_FRAME + WIN_TITLE, "Central Facility" ) ;
    messageWindow = NewWindow( 1, 14, 80, 23,
      WIN_FRAME + WIN_TITLE, "Messages" ) ;
    commandWindow = NewWindow( 1, 23, 80, 25,
      WIN_FRAME + WIN_TITLE, "Command:" ) ;

for ( keepOn = 1 ; keepOn ; )
    {
      ChangeWindow( commandWindow ) ;
      clrscr() ;
      commandLine = getCommandLine() ;
      if ( strlen( commandLine ) > 0 )
      {
          if ( strcmpi( commandLine, "h" ) == 0 )
          {
            help() ;
          }
          else if ( strncmpi( commandLine, "e ", 2 ) == 0 )
          {
            enroll( commandLine + 2 ) ;
          }
          else if ( strncmpi( commandLine, "v ", 2 ) == 0 )
          {
            verify( commandLine + 2 ) ;
          }
          else if ( strcmpi( commandLine, "p" ) == 0 )
          {
            userPrint() ;
          }
          else if ( strncmpi( commandLine, "d ", 2 ) == 0 )
          {
            userDelete( trim( commandLine + 2 ) ) ;
          }
          else if ( strcmpi( commandLine, "q" ) == 0
          ||        strcmpi( commandLine, "x" ) == 0 )
          {
            keepOn = 0 ;
          }
          else
          {
            pauseMessage(
                "Unrecognized command.\n"
                "Enter \"h\" for help." ) ;
          }
      }     /* End of "if strlen( commandLine ) > 0 ". */
    } closeReader() ;
    return 0 ;
} static void clearWindows( void )
/*
    Clear certain windows.
*/
{
    ChangeWindow( fieldWindow ) ;
```

© 1996 UC Regents     Appendix A     p. 5

- 6 -

```
    clrscr() ;
    ChangeWindow( centerWindow ) ;
    clrscr() ;
    ChangeWindow( messageWindow ) ;
    clrscr() ;
} static int compareDigests( digestType *a, digestType *b )
/*
    Compare two message digests.
    Return 0 if they are equal, 1 if they differ.
*/
{
    int i ;

i = a->length ;
    if ( i != b->length )
      return 1 ;
    while ( --i >= 0 )
    {
      if ( a->bytes[i] != b->bytes[i] )
          return 1 ;
    }
    return 0 ;
} static digestType *digestKey( unsigned char *key, int keyLength )
/*
Compute the message digest of the provided key.

The return value is a pointer to a static message digest, which
will be overwritten the next time this function is called.
*/
{
    R_DIGEST_CTX context ;
    static digestType result ;

if ( R_DigestInit( &context, DA_MD5 ) != 0 )
      pauseMessage( "Error from R_DigestInit" ) ;
    else if ( R_DigestUpdate( &context, key, keyLength ) != 0 )
      pauseMessage( "Error from R_DigestUpdate" ) ;
    else if ( R_DigestFinal( &context, result.bytes, &result.length ) !=
0 )
      pauseMessage( "Error from R_DigestFinal" ) ;

return &result ;
} static void enroll( char *name )
/*
    Enroll the named user.

This is mostly "field" code.

1. Get a reading.
2. Generate our public and private proof-of-identity parameters.
3. Register with the Center our public parameters and an error-
```

© 1996 UC Regents  Appendix A  p. 6

```
        correction code that links our private parameter to our reading.
*/
{
    char *trimmedName ;
    readingType reading ;
    userRecordType userRecord ;
    unsigned char publicValue[ kPrimeBytes ] ;
    unsigned char privateValue[ kPrivateBytes ] ;
    unsigned char *dummyData ;
    int dummyLength ;
    unsigned long randomValue ;
    unsigned long secretCodeword ;

trimmedName = trim( name ) ;
    clearWindows() ;
    outStartSequence() ;
    outNewStep( fieldWindow, "Enrolling \"%s\".", trimmedName ) ;

if ( getReading( &reading ) != 0 )
    {
      pauseMessage( "Failed to get reading." ) ;
    }
    else if ( userLookup( trimmedName, &dummyData, &dummyLength ) != 0 )
    {
      pauseMessage( "That user is already enrolled." ) ;
    }
    else
    {
      OUTSSB_OBJ( "Reading", reading ) ;

/* Security caveat: In a real-world application, you would
      ** want to use a better cryptographically secure pseudo-random-
number generator in the following
      ** statement.
      */
      randomValue = Rand32() ;
      rmEncode( REEDMULLER, (unsigned char *) &randomValue,
          (unsigned char *) &secretCodeword ) ;
      generatePersonalParams( secretCodeword, publicValue, privateValue
) ;

OUTSSB_OBJ( "Secret codeword", secretCodeword ) ;
      OUTSSB_PTR( "Public product", publicValue ) ;
      OUTSSB_PTR( "Secret exponent", privateValue ) ;

memcpy( userRecord.publicValue, publicValue, sizeof( publicValue )
) ;
      userRecord.errorCorr.refXorMask = secretCodeword ^ reading ;

outNewStep( messageWindow, ">> Enrollment data for %s.",
          trimmedName ) ;
      OUTSSB_PTR( "Public product", publicValue ) ;
      OUTSSB_OBJ( "Corrector info", userRecord.errorCorr.refXorMask ) ;

userAdd( trimmedName, (unsigned char *) &userRecord,
          sizeof( userRecord ) ) ;
```

© 1996 UC Regents      Appendix A      p. 7

-8-

```
        outNewStep( centerWindow, "%s has been enrolled", trimmedName ) ;
    }
} static void evaluateResponse( responseType *response )
/*
      "Center" code: This is the function by which the host
      ("Center") decides whether a given response satisfies the
      last challenge issued.
*/
{
    digestType *goodDigest ;
    unsigned char agreedKey[ kPrimeBytes ] ;

if ( R_ComputeDHAgreedKey( agreedKey, proversPublic,
         challengersPrivate, kPrivateBytes, &dhParams ) != 0 )
    {
      pauseMessage( "Error return from R_ComputeDHAgreedKey" ) ;
    }
    else
    {
      goodDigest = digestKey( agreedKey, kPrimeBytes ) ;
      outNewStep( centerWindow, "Computed correct response." ) ;
      outSameStepBytes( "Should be",
            goodDigest->bytes, goodDigest->length ) ;
      if ( compareDigests( goodDigest, &response->digest ) == 0 )
      {
          outSameStep( "Verdict: OK" ) ;
          pauseMessage( "Verdict: OK" ) ;
      }
      else
      {
          outSameStep( "Verdict: REJECT" ) ;
          pauseMessage( "Verdict: REJECT" ) ;
      }
    }
} static void generatePersonalParams( const readingType reading,
            unsigned char publicValue[ kPrimeBytes ],
            unsigned char privateValue[ kPrivateBytes ] )
/*
This is "Field" code.

Use the reading provided in the first argument to choose, in a
deterministic way, the public and private parameters of a Diffie-
Hellman initial key agreement message.
*/
{
    unsigned int bytesNeeded ;
    R_CRYPTOGRAPHICALLY SECURE PSEUDO-RANDOM_STRUCT cryptographically
secure pseudo-random ;

/* Use the reading to initialize the pseudorandom generator: */

R_RandomInit( &cryptographically secure pseudo-random ) ;
    do {
```

© 1996 UC Regents　　　Appendix A　　　p. 8

```
        R_RandomUpdate( &cryptographically secure pseudo-random, (unsigned
char *) &reading,
            sizeof( readingType ) ) ;
        R_GetRandomBytesNeeded( &bytesNeeded, &cryptographically secure
pseudo-random ) ;
    } while ( bytesNeeded > 0 ) ;

/* Use the pseudorandom generator to start a Diffie-Hellman
    ** key agreement:
    */ if ( R_SetupDHAgreement( publicValue, privateValue, kPrivateBytes,
            &dhParams, &cryptographically secure pseudo-random ) != 0 )
    {
        pauseMessage( "Error in R_SetupDHAgreement" ) ;
    }

/* Discard the pseudorandom generator: */

R_RandomFinal( &cryptographically secure pseudo-random ) ;
} static char *getCommandLine( void )
/*
    Accept a command line from the keyboard.
    Trim leading and trailing spaces.
    Return a pointer to the trimmed command line.
*/
{
    static char commandLine[ kMaxCommandLength + 1 ] ;

fgets( commandLine, kMaxCommandLength, stdin ) ;
    return trim( commandLine ) ;
} static void help( void )
{
    pauseMessage(
    "h          = help\n"
    "e <user>   = present this user for enrollment\n"
    "v <user>   = verify this user\n"
    "p          = print list of users\n"
    "d alice    = delete the user named \"alice\".\n"
    "q,x        = quit\n"
    "\n"
    "(The next key hit will remove this window.)"
        ) ;
} static void makeChallenge( userRecordType *userRecord,
                    challengeType *challenge )
/*
    "Center" code: construct a challenge to test the identity
    of the user whose data record is passed to us.

The challenge is returned as a pointer to a static array, which will be
overwritten the next time we're called.
```

© 1996 UC Regents     Appendix A     p. 9

- 10 -

```
Vulnerability note: If an adversary can guess the cryptographically
secure pseudo-random numbers that
the Center is using to generate challenges, he can compute the correct
response without knowing the user's biometric data. Therefore, in a
real-world application, the Center should use a more sophisticated
initialization of its cryptographically secure pseudo-random number
generator. Good options include
(1) soliciting keystrokes from the keyboard, and timing them; and
(2) cryptographically secure pseudo-random-number hardware. Neither of
these options is practical for
this demonstration code.
*/
{
    static int first = 1 ;
    unsigned int bytesNeeded ;
    static R_CRYPTOGRAPHICALLY SECURE PSEUDO-RANDOM_STRUCT
cryptographically secure pseudo-random ;
    struct time currentTime ;

if ( first )
    {
      R_RandomInit( &cryptographically secure pseudo-random ) ;
      first = 0 ;
    }

/* Every time we're called, do a little more randomization. */ do {
      gettime( ¤tTime ) ;
      R_RandomUpdate( &cryptographically secure pseudo-random, (unsigned
char *) ¤tTime.ti_hund,
         sizeof( currentTime.ti_hund ) ) ;
      R_GetRandomBytesNeeded( &bytesNeeded, &cryptographically secure
pseudo-random ) ;
    } while ( bytesNeeded > 0 ) ;

/* Now, down to work: Generate the challenge. */ if ( R_SetupDHAgreement( challengersPublic,
                    challengersPrivate,
                    kPrivateBytes, &dhParams, &cryptographically
secure pseudo-random ) != 0 )
    {
      pauseMessage( "Error in R_SetupDHAgreement" ) ;
    }
    memcpy( proversPublic,
         userRecord->publicValue, kPrimeBytes ) ;
    memcpy( challenge->challengePublic,
         challengersPublic, kPrimeBytes ) ;
} static int makeResponse( errorCorrType *errorCorr,
              challengeType *challenge, responseType *response )
/*
    "Field" code: construct a response to the given challenge,
    given certain error-correction information.
```

© 1996 UC Regents    Appendix A    p. 10

```
Returns: 0 normally, nonzero if something fails.
*/
{
    int result ;
    readingType reading ;
    unsigned char publicValue[ kPrimeBytes ] ;
    unsigned char privateValue[ kPrivateBytes ] ;
    unsigned char agreedKey[ kPrimeBytes ] ;
    unsigned long approxCodeword ;
    unsigned long reconstructed ;   /* Error-corrected codeword. */
    unsigned long randomValue ;

outNewStep( fieldWindow, "Received challenge." ) ;
    result = getReading( &reading ) ;
    if ( result != 0 )
    {
      pauseMessage( "Failed to get reading." ) ;
    }
    else
    {
      OUTSSB_OBJ( "Reading", reading ) ;

approxCodeword = errorCorr->refXorMask ^ reading ;

OUTSSB_OBJ( "Approx codeword", approxCodeword ) ;

/* Set "reconstructed" to the legal codeword that is
      ** closest (in the Hamming sense) to "approxCodeword": */ rmDecode( REEDMULLER, (unsigned char *) &approxCodeword,
          (unsigned char *) &randomValue ) ;
      rmEncode( REEDMULLER, (unsigned char *) &randomValue,
          (unsigned char *) &reconstructed ) ;

OUTSSB_OBJ( "Reconstructed codeword", reconstructed ) ;

/* Refuse to correct more than 5 bits. */ if ( popCount( reconstructed ^ approxCodeword ) > 5 )
      {
          outSameStep( "Reading is too different." ) ;
          pauseMessage( "Reading is too different.\r\n"
             "Verification abandoned." ) ;
          return 1 ;
      } generatePersonalParams( reconstructed, publicValue, privateValue )
;

OUTSSB_PTR( "Reconstituted secret exponent", privateValue ) ;

if ( R_ComputeDHAgreedKey( agreedKey,
          challenge->challengePublic, privateValue,
          kPrivateBytes, &dhParams ) != 0 )
      {
          pauseMessage( "Error return from R_ComputeDHAgreedKey" ) ;
```

© 1996 UC Regents          Appendix A                    p. 11

```
            result = 1 ;
        }
        else
        {
            response->digest = *digestKey( agreedKey, kPrimeBytes ) ;
        }
    }
    return result ;
} static int popCount( unsigned long x )
/* Return the number of 1-bits in x.
*/
{
    int i, result ;
    static int Lookup[256] = {
0, 1, 1, 2, 1, 2, 2, 3, 1, 2, 2, 3, 2, 3, 3, 4,
1, 2, 2, 3, 2, 3, 3, 4, 2, 3, 3, 4, 3, 4, 4, 5,
1, 2, 2, 3, 2, 3, 3, 4, 2, 3, 3, 4, 3, 4, 4, 5,
2, 3, 3, 4, 3, 4, 4, 5, 3, 4, 4, 5, 4, 5, 5, 6,
1, 2, 2, 3, 2, 3, 3, 4, 2, 3, 3, 4, 3, 4, 4, 5,
2, 3, 3, 4, 3, 4, 4, 5, 3, 4, 4, 5, 4, 5, 5, 6,
2, 3, 3, 4, 3, 4, 4, 5, 3, 4, 4, 5, 4, 5, 5, 6,
3, 4, 4, 5, 4, 5, 5, 6, 4, 5, 5, 6, 5, 6, 6, 7,
1, 2, 2, 3, 2, 3, 3, 4, 2, 3, 3, 4, 3, 4, 4, 5,
2, 3, 3, 4, 3, 4, 4, 5, 3, 4, 4, 5, 4, 5, 5, 6,
2, 3, 3, 4, 3, 4, 4, 5, 3, 4, 4, 5, 4, 5, 5, 6,
3, 4, 4, 5, 4, 5, 5, 6, 4, 5, 5, 6, 5, 6, 6, 7,
2, 3, 3, 4, 3, 4, 4, 5, 3, 4, 4, 5, 4, 5, 5, 6,
3, 4, 4, 5, 4, 5, 5, 6, 4, 5, 5, 6, 5, 6, 6, 7,
3, 4, 4, 5, 4, 5, 5, 6, 4, 5, 5, 6, 5, 6, 6, 7,
4, 5, 5, 6, 5, 6, 6, 7, 5, 6, 6, 7, 6, 7, 7, 8 } ;

for ( result = 0, i = sizeof( x ) ; --i >= 0 ; )
    {
      result += Lookup[ (int)( x & 0xff ) ] ;
      x >>= 8 ;
    }
    return result ;
} static char *trim( char *text )
/*
    Trim leading and trailing whitespace from the text.
*/
{
    char *result ;
    int len ;

for ( result = text ;
      *result != '\0' && isgraph( *result ) == 0 ;
      ++result )
      ;

for ( len = strlen( result ) - 1 ;
        len > 0 && isgraph( result[ len ] ) == 0 ;
        --len )
```

© 1996 UC Regents  Appendix A  p. 12

- 13 -

```
    {
      result[ len ] = '\0' ;
    } return result ;
} static void verify( char *name )
/*
     Verify the user named.

This is a mixture of "Field" and "Center" code; but note that
most of the "Center" code is encapsulated in the makeChallenge
and evaluateResponse functions.
*/
{
    char *trimmedName ;
    int dataLength ;
    userRecordType *userRecord ;
    challengeType challenge ;
    responseType response ;

trimmedName = trim( name ) ;
    outStartSequence() ;
    clearWindows() ;
    outNewStep( fieldWindow, "Verify \"%s\".", trimmedName ) ;

outNewStep( messageWindow, ">> Lookup this user: %s.", trimmedName )
;

/* The host looks up in its database the user to be verified.
    ** If a record is found for this user, the host sends
    **      ... the error-correction information for this user, and
    **      ... a "challenge" in the form of an initial Diffie-Hellman
    **             key-agreement message.
    */ if ( userLookup( trimmedName, (unsigned char **) &userRecord,
       &dataLength ) == 0 )
    {
      outNewStep( centerWindow, "\"%s\" not found.", trimmedName ) ;
      outNewStep( messageWindow, "<< No such user." ) ;
    }
    else
    {
      outNewStep( centerWindow, "\"%s\" found.", trimmedName ) ;

makeChallenge( userRecord, &challenge ) ;

OUTSSB_OBJ( "challenge", challenge ) ;

outNewStep( messageWindow, "<< Data and challenge for \"%s\"",
          trimmedName ) ;
      OUTSSB_OBJ( "Corrector", userRecord->errorCorr ) ;
      OUTSSB_OBJ( "Challenge", challenge ) ;

if ( makeResponse( &userRecord->errorCorr, &challenge, &response )
```

© 1996 UC Regents     Appendix A     p. 13

- 14 -

```
                == 0 )
        {
                outNewStep( messageWindow, ">> Response to challenge" ) ;
                outSameStepBytes( "Computed response",
                   response.digest.bytes, response.digest.length ) ;

evaluateResponse( &response ) ;
        }
     }
}

---------------------------- outputs.h ----------------------------
/* outputs.h - Functions for facilitating output to windows and log
file.
Version of 95.09.25.
*/

/*********************************************************************
* outStartSequence resets the sequence number and, if necessary,
* attempts to open the log file.
*********************************************************************/
void outStartSequence( void ) ;

/*********************************************************************
* outNewStep writes data to the log file, and to the specified
* window. The sequence number is incremented.
* The arguments from "fmt" onward are just as for "printf".
*********************************************************************/
void outNewStep( WindowType w, char *fmt, ... ) ;

/*********************************************************************
* outSameStep can be called after outNewStep to continue the
* writing into the same window with the same sequence number.
*********************************************************************/
void outSameStep( char *fmt, ... ) ;

/*********************************************************************
* outSameStepBytes can be called after outNewStep to write an
* arbitrary number of hexadecimal bytes into the same window
* with the same sequence number.
*********************************************************************/ void outSameStepBytes( char *title, unsigned char *bytes, int length ) ;

/*********************************************************************
* outClose closes the log file.
*********************************************************************/
void outClose( void ) ;

---------------------------- outputs.c ----------------------------
/* outputs.c - Functions for facilitating output to windows and log
file.
Version of 95.09.25.
*/
```

© 1996 UC Regents      Appendix A      p. 14

- 15 -

```c
#include <stdio.h>
#include <stdarg.h>
#include "windows.h"
#include "winplus.h"

define kLineLength 500 static char logFileName[] = "demo.log" ;
static int  attemptedOpen = 0 ;
static FILE *logFile ;
static int sequenceNumber ;

/* The following disgraceful breach of module boundaries allows
** us to label each output line with the identity of the window
** to which it was written:
*/ extern WindowType fieldWindow ;
extern WindowType centerWindow ;
extern WindowType messageWindow ;

static char *windowName ;

static void attemptOpen( void ) ;
static void setWindowName( WindowType w ) ;

static void attemptOpen( void )
/*
    If we haven't yet attempted to open the output file, do so.
*/
{
    if ( attemptedOpen == 0 )
    {
      attemptedOpen = 1 ;
      logFile = fopen( logFileName, "a+" ) ;
      if ( logFile == NULL )
      {
          pauseMessage( "Warning: failed to open log file." ) ;
      }
    }
} void outStartSequence( void )
{
    sequenceNumber = 0 ;
    if ( logFile == NULL )
      attemptOpen() ;
    else
      fprintf( logFile, "\n\n" ) ;
} void outNewStep( WindowType w, char *fmt, ... )
{
    va_list argptr ;
```

© 1996 UC Regents        Appendix A        p. 15

```
    char line[ kLineLength ] ;

va_start( argptr, fmt ) ;
    vsprintf( line, fmt, argptr ) ;
    va_end( argptr ) ;

ChangeWindow( w ) ;
    setWindowName( w ) ;
    cprintf( "\r\n%2d. %s", ++sequenceNumber, line ) ;
    if ( logFile != NULL )
      fprintf( logFile, "%2d. %s: %s\r\n", sequenceNumber,
           windowName, line ) ;
} void outSameStep( char *fmt, ... )
{
    va_list argptr ;
    char line[ kLineLength ] ;

va_start( argptr, fmt ) ;
    vsprintf( line, fmt, argptr ) ;
    va_end( argptr ) ;

cprintf( "\r\n%2d. %s", sequenceNumber, line ) ;
    if ( logFile != NULL )
      fprintf( logFile, "%2d. %s: %s\r\n",
           sequenceNumber, windowName, line ) ;
} void outSameStepBytes( char *title, unsigned char *bytes, int length )
{
    cprintf( "\r\n%2d. %s:", sequenceNumber, title ) ;
    if ( logFile != NULL )
      fprintf( logFile, "%2d. %s: %s:",
           sequenceNumber, windowName, title ) ;
    for ( ; --length >= 0 ; ++bytes )
    {
      cprintf( " %02x", *bytes ) ;
      if ( logFile != NULL )
          fprintf( logFile, " %02x", *bytes ) ;
    }
    if ( logFile != NULL )
      fprintf( logFile, "\n" ) ;
} void outClose( void )
{
    fclose( logFile ) ;
    logFile = NULL ;
    attemptedOpen = 0 ;
    sequenceNumber = 0 ;
} static void setWindowName( WindowType w )
{
    windowName = ( w == fieldWindow ) ? " Field"
               : ( w == centerWindow ) ? "Center"
```

© 1996 UC Regents     Appendix A     p. 16

```
                    : ( w == messageWindow ) ? "Messge"
                    :                          "??????" ;
}

------------------------------ pause.h ------------------------------
/* PAUSE.H - Definition of the Pause function.
Version of 2 November 1988.
*/

/***********************************************************************
 *
 * Pause for the specified number of seconds, or perhaps just a
 * little bit longer.
 *
 ***********************************************************************/ void Pause( double Seconds ) ;

------------------------------ cryptographically secure pseudo-random.h
------------------------------
/* CRYPTOGRAPHICALLY SECURE PSEUDO-RANDOM.H - Definitions for use of
cryptographically secure pseudo-random-number functions.
Version of 94.04.07.

Revision history:
      94.04.07 - Add randFixStart.
*/ ifndef CRYPTOGRAPHICALLY SECURE PSEUDO-RANDOM
define CRYPTOGRAPHICALLY SECURE PSEUDO-RANDOM unsigned Rand16(void) ;         /* 0x0000 to 0xFFFF. */
unsigned long Rand32(void) ;    /* 0x00000000 to 0xFFFFFFFF. */
float RandFl(void) ;            /* 0 <= x < 1. */
void randFixStart( long seed ) ; /* To restart from a reproducible
      */
                        /* state. */ endif

------------------------------ reading.h ------------------------------
/* reading.h - Driver for the hand-geometry reader.
Version of 95.09.27.

Typical usage:
      if ( openReader() != 0 )
           printf( stderr, "Couldn't hook up to the reader!\n" ) ;
      else
      {
          while ( whatever )
          {
            if ( getReading( &reading ) == 0 )
            {
```

```
                ... Process the reading ...
            }
        }
        closeReader() ;
    }
*/ typedef unsigned long readingType ;

/************************************************************************
** getReading
** gets a reading from the hand geometry reader.
** openReader must have been called previously.
** Returns 0 = SUCCESS, 1 = FAILURE.
************************************************************************/ int getReading( readingType *reading ) ;

/************************************************************************
** openReader
** Returns 0 = SUCCESS, 1 = FAILURE.
************************************************************************/ int openReader( void ) ;

/************************************************************************
** closeReader
************************************************************************/ void closeReader( void ) ;

------------------------------- userlist.h -------------------------------
/* userlist.h - Package for maintaining our list of users.
Version of 95.09.13.
*/

/************************************************************************
* userAdd: Add a user to our list of users.
* Attach the specified binary data to the newly added user.
************************************************************************/ void userAdd( char *name, unsigned char *binData, int dataLength ) ;

/************************************************************************
* Delete the specified user from our list.
************************************************************************/ void userDelete( char *name ) ;

/************************************************************************
* Look up the specified user in our list. Set a pointer to this
* user's binary data, and set its length.
* Return 1 if the lookup is successful, 0 if we don't find this user.
************************************************************************/
int  userLookup( char *name, unsigned char **binData, int *dataLength )
;
```

© 1996 UC Regents      Appendix A      p. 18

- 19 -

```c
/***********************************************************************
 * Print a list of all our users.
 ***********************************************************************/
void userPrint( void ) ;

------------------------------- userlist.c -----------------------------
/* userlist.c - Implementation of the userlist package.
Version of 95.09.13.
*/ include <conio.h>
include <stdio.h>
#include <stdlib.h>
#include <mem.h>
#include <string.h>
#include "userlist.h"
#include "windows.h"

define kMaxUsers 20 typedef struct {
    char *name ;
    int  dataLength ;
    unsigned char *dataString ;
} userRecordType ;

static int nUsers = 0 ;
static userRecordType userRecord[ kMaxUsers ] ;

static int userIndex( char *name ) ;

void userAdd( char *name, unsigned char *binData, int dataLength )
{
    userRecordType *newGuy ;

if ( nUsers < kMaxUsers - 1 && userIndex( name ) == -1 )
    {
      newGuy = userRecord + nUsers ;

newGuy->name = malloc( 1 + strlen( name ) ) ;
      newGuy->dataLength = dataLength ;
      newGuy->dataString = malloc( dataLength ) ;

if ( newGuy->name != NULL
      &&   newGuy->dataString != NULL )

{
          strcpy( newGuy->name, name ) ;
          memcpy( newGuy->dataString, binData, dataLength ) ;
          ++nUsers ;
      }
    }
} void userDelete( char *name )
```

© 1996 UC Regents      Appendix A      p. 19

```c
{
    int i ;

i = userIndex( name ) ;
    if ( i >= 0 )
    {
      free( userRecord[i].name ) ;
      free( userRecord[i].dataString ) ;
      while ( ++i < nUsers )
      {
          userRecord[ i-1 ] = userRecord[ i ] ;
      }
      --nUsers ;
    }
} static int userIndex( char *name )
/*
    Return the index of this user in our array, or -1 if not there.
*/
{
    int i ;

for ( i = 0 ; i < nUsers ; ++i )
    {
      if ( strcmp( userRecord[i].name, name ) == 0 )
          return i ;
    } return -1 ;
} int  userLookup( char *name, unsigned char **binData, int *dataLength )
{
    int i ;

i = userIndex( name ) ;
    if ( i >= 0 )
    {
      *dataLength = userRecord[i].dataLength ;
      *binData =    userRecord[i].dataString ;
      return 1 ;
    }
    return 0 ;
} void userPrint( void )
{
    int i ;
    WindowType w ;

w = NewWindow( 1, 1, 80, 24, WIN_FRAME + WIN_TITLE, "User List:" ) ;
    for ( i = 0 ; i < nUsers ; ++i )
    {
      cprintf( "%2d %s\r\n", i, userRecord[i].name ) ;
    }
    cprintf( "\r\n\nHit any key to resume." ) ;
```

- 21 -

```
    getch() ;
    CloseWindow( &w ) ;
}

---------------------------- windows.h ----------------------------
/* WINDOWS.H - Text windowing package.
Version of 92.11.05.
Author: Peter Pearson.
*/ ifndef WINDOWS_INCLUDED
define WINDOWS_INCLUDED include <conio.h>

/***********************************************************************
 * These attributes may be specified in the NewWindow call:

***********************************************************************/ define WIN_PLAIN   0   /* Window boundaries are invisible. */
define     WIN_FRAME   1    /* Window will have a 1-character-wide
border.     */
#define     WIN_TITLE   2    /* If framed, window will have a title.
      */ typedef struct WindowStruct {
        int MagicValue ;    /* Internal use: guarantee valid pointer. */
        int Attributes ;
        struct text_info *MyParams ;  /* Important note below.   */
        struct text_info *PrevParams ;  /* (Need if has no parent.) */
        struct WindowStruct *ParentWindow ;
        void *Covered ;
        } *WindowType ;

/* Important note on MyParams:
 * MyParams contains the parameters defining the *interior* of the
 * window, that is, the region of the window into which the user will
 * generall want to write text. In a frameless window, this is the
 * whole area covered by the window. In a framed window, the area
 * covered by the window extends one character beyond MyParams in
 * each direction. Thus, for assessing the amount of space available
 * in the window, use MyParams directly. When restoring the stuff
 * hidden by the window, we have to account for the frame.
 */

/***********************************************************************
 *
 * NewWindow creates a new window object. It should be called before
 * any other functions in this package.
 * If Attributes includes WIN_FRAME, a 1-character-wide frame is drawn
 * around the window and, if Attributes also includes WIN_TITLE, the
 * title is written at the center of the top of the frame. The
 * boundaries of the window are reduced by the width of the frame.
 *
***********************************************************************/
```

© 1996 UC Regents      Appendix A      p. 21

```
WindowType NewWindow( int Left, int Top, int Right, int Bottom,
                 int Attributes, char *Title ) ;

/***********************************************************************
 *
 * ChangeWindow changes to the specified window, returning the
 * previously-selected window for convenience when you want to
 * change back.
 * This routine is intended for use in contexts where windows are
 * non-overlapping and pretty much permanent. The portion of the screen
 * obstructed by the changed-out-of window is NOT restored. A sequence
 * of ChangeWindow, CloseWindow, ChangeWindow, CloseWindow can end up
 * trying to close a window whose parent has already been closed, which
 * can produce wild results.
 *
 ***********************************************************************/

WindowType ChangeWindow( WindowType W ) ;

/***********************************************************************
 *
 * CloseWindow restores the text hidden by the indicated window.
 * The parent of *W is re-established as the active window.
 * The memory occupied by *W is freed, and W is set to NULL.
 *
 ***********************************************************************/ void CloseWindow( WindowType *W ) ;

/***********************************************************************
 *
 * ScrollUp moves the text in the present window one line higher,
 * and clears the bottom line.
 *
 ***********************************************************************/ void ScrollUp( void ) ;

/***********************************************************************
 *
 * ScrollDown moves the text in the present window one line lower,
 * and clears the top line.
 *
 ***********************************************************************/ void ScrollDown( void ) ;

endif

-------------------------- winplus.h ----------------------------
/* winplus.h - Add-on functions for the windows package.
Version of 95.09.13.
*/
```

- 23 -

```
/***********************************************************************
 * Display the furnished message in its own window, and wait for the
 * user to hit a key.
 * The newly created window will be centered, and just large enough
 * for the message. The message may be multi-line.
 ***********************************************************************/ void pauseMessage( char *text ) ;

---------------------------------- end ---------------------------------
---
```

The invention claimed is:

1. A biometric password enrollment system, comprising:

number generator means for producing a secret codeword "C";

conversion means for combining a biometric measurement "E", having an inherent natural variability from a user, with said secret codeword "C" to produce a reference value "R";

public parameter generation means for combining a public base number "p, g" with a secret exponent "i" derived from said secret codeword "C" to compute $I=g^i$ mod p; and relational means for associating in a database a name "N" for said user with said reference value "R" and said public parameter "I".

2. A biometric password verification method, comprising the steps of:

associating in a database a name "N" for a user with a reference value "R" and a public parameter "I";

obtaining a biometric reading "V" and a name "N" provided by a user and which serves as a password to-be-verified before access to a system is allowed to said user;

fetching from said database said value "R" and said parameter "I" related to said name "N";

computing an approximate codeword "C'" from the exclusive-OR combination of said reading "V" and said value "R";

obtaining a secret codeword "C" that most nearly matches said approximate codeword "C'";

seeding a pseudo-random number generator with secret codeword "C" to obtain a secret exponent "i";

obtaining an exponent "j" from a random number generator;

computing $J=g^j$ mod p, where "p" is a public modulus; and computing $z=MD5$ ($J^i$ mod p), where MD5 is a hashing function.

3. The method of claim 2, further comprising the steps of:

computing $z'=MD5$ ($I^j$ mod p); and comparing z to z';

wherein a match between z and z' indicates an authorized access.

4. A method for biometric authentication, comprising the steps of:

defining a set of original error correcting codewords;

recording original biometric measurements from a set of users;

convolving each of the original biometric measurements with a different original error correcting codeword from the set of original error correcting codewords to generate a set of reference values;

recording a current biometric measurement from an unknown user;

retrieving a reference value from the set of reference values which allegedly corresponds to the unknown user;

deconvolving the current biometric measurement with the reference value to generate a reproduced error correcting codeword; and identifying the unknown user as one of the set of users if the reproduced error correcting codeword is equal to one of the set of original error correcting codewords.

5. The method of claim 4, further comprises:

using Diffie-Hellman public key encryption schemes and hashing procedures to secure a communications line carrying said biometric measurements and to secure a database of the set of users.

6. The method of claim 4, further comprises:

using a Reed-Muller code R(2,5) to improve communication error susceptibility.

7. The method of claim 4, wherein the steps of convolving and deconvolving are equivalent to exclusive-ORing.

8. The method of claim 4, wherein the generating step includes the step of:

spacing the set of error correcting codewords apart by a Hamming distance which exceeds biometric variations between the set of users.

9. The method of claim 4, further comprising the step of:

spacing the set of error correcting codewords apart by a Hamming distance at least twice a largest Hamming distance probable between two biometric measurements from any one user.

10. The method of claim 4, further comprising the step of:

spacing the set of error correcting codewords apart by a Hamming distance less than a smallest Hamming distance probable between biometric measurements from any two users.

11. The method of claim 4, further comprising the step of:

rejecting the unknown user as not one of the set of users if the reproduced error correcting codeword is outside of the Hamming distance spacing of adjacent original error correcting codewords.

12. The method of claim 4:

wherein the current biometric measurement has an inherent natural single-user biometric-reading variability; and further comprising the step of:

rejecting the unknown user as not one of the set of users if the reproduced error correcting codeword differs from the original error correcting codewords by more than the inherent natural single-user biometric-reading variability.

13. The method of claim 4, further comprising the steps of:

selecting a nearest error correcting codeword from the set of original error correcting codewords, if the reproduced error correcting codeword is not equal to one of the set of original error correcting codewords; and recovering an original biometric measurement from the current biometric measurement by toggling those bits in the current biometric measurement which correspond to those bits in the reproduced error correcting codeword which must be toggled to obtain the nearest error correcting codeword.

14. The method of claim 4, further comprising the steps of:

selecting a nearest error correcting codeword from the set of original error correcting codewords, if the reproduced error correcting codeword is not equal to one of the set of original error correcting codewords; and recovering an original cryptographically secure random number from the nearest error correcting codeword.

15. A biometric password enrollment method, comprising the steps of:

produbcing a secret codeword "C";

combining a biometric measurement "E", having an inherent natural variability from a user, with said secret codeword "C" to produce a reference value "R";

combining a public base number "p, g" with a secret exponent "i" derived from said secret codeword "C" to compute $I=g^i$ mod p; and associating in a database a name "N" for said user with said reference value "R" and said public parameter "I".

16. A biometric password verification system, comprising:

means for associating in a database a name "N" for a user with a reference value "R" and a public parameter "I";

means for obtaining a biometric reading "V" and a name "N" provided by a user and which serves as a password to-be-verified before access to a system is allowed to said user;

means for fetching from said database said value "R" and said parameter "I" related to said name "N";

means for computing an approximate codeword "C'" from the exclusive-OR combination of said reading "V" and said value "R";

means for obtaining a secret codeword "C" that most nearly matches said approximate codeword "C'";

means for seeding a pseudo-random number generator with secret codeword "C" to obtain a secret exponent "i";

means for obtaining an exponent "j" from a random number generator;

means for computing $J=g^j$ mod p, where "p" is a public modulus; and means for computing z=MD5 ($J^i$ mod p), where MD5 is a hashing function.

17. The system of claim 16, further comprising:

means for computing z'=MD5 ($I^j$ mod p); and means for comparing z to z';

wherein a match between z and z' indicates an authorized access.

18. A computer-usable medium embodying computer program code for causing a computer to effect biometric password enrollment by performing the steps of:

producing a secret codeword "C";

combining a biometric measurement "E", having an inherent natural variability from a user, with said secret codeword "C" to produce a reference value "R";

combining a public base number "p, g" with a secret exponent "i" derived from said secret codeword "C" to compute $I=g^i$ mod p; and associating in a database a name "N" for said user with said reference value "R" and said public parameter "I".

19. A computer-usable medium embodying computer program code for causing a computer to effect biometric password verification by performing the steps of:

associating in a database a name "N" for a user with a reference value "R" and a public parameter "I";

obtaining a biometric reading "V" and a name "N" provided by a user and which serves as a password to-be-verified before access to a system is allowed to said user;

fetching from said database said value "R" and said parameter "I" related to said name "N";

computing an approximate codeword "C'" from the exclusive-OR combination of said reading "V" and said value "R";

obtaining a secret codeword "C" that most nearly matches said approximate codeword "C'";

seeding a pseudo-random number generator with secret codeword "C" to obtain a secret exponent "i";

obtaining an exponent "j" from a random number generator;

computing $J=g^j$ mod p, where "p" is a public modulus; and computing z=MD5 ($J^i$ mod p), where MD5 is a hashing function.

20. The computer-usable medium of claim 19 further performing the steps of:

computing z'=MD5 ($I^j$ mod p); and comparing z to z';

wherein a match between z and z' indicates an authorized access.

\* \* \* \* \*